(12) United States Patent
Goodfellow et al.

(10) Patent No.: US 10,892,793 B2
(45) Date of Patent: Jan. 12, 2021

(54) AERODYNAMIC MOUNT FOR A MODULE

(71) Applicant: Juggernaut Defense, LLC, Scottsdale, AZ (US)

(72) Inventors: Andrew C. Goodfellow, Scottsdale, AZ (US); Thomas Muday, Scottsdale, AZ (US); Chris Stalzer, Scottsdale, AZ (US)

(73) Assignee: Juggernaut Defense, LLC, Scottsdale, AZ (US)

( * ) Notice: Subject to any disclaimer, the term of this patent is extended or adjusted under 35 U.S.C. 154(b) by 0 days.

(21) Appl. No.: 16/737,681

(22) Filed: Jan. 8, 2020

(65) Prior Publication Data

US 2020/0350944 A1 Nov. 5, 2020

Related U.S. Application Data

(60) Provisional application No. 62/789,801, filed on Jan. 8, 2019.

(51) Int. Cl.
*H04B 1/03* (2006.01)
*H04B 1/3888* (2015.01)
*H04B 1/3827* (2015.01)

(52) U.S. Cl.
CPC ........... *H04B 1/3888* (2013.01); *H04B 1/385* (2013.01); *H04B 2001/3855* (2013.01)

(58) Field of Classification Search
CPC ....................................................... H05K 5/03
USPC ...................................................... 455/575.8
See application file for complete search history.

(56) References Cited

U.S. PATENT DOCUMENTS

| | | |
|---|---|---|
| 4,254,568 A | 3/1981 | Ranalli |
| 5,937,765 A | 8/1999 | Stirling |
| 9,652,002 B2 | 5/2017 | Hamann et al. |
| 10,097,677 B1 | 10/2018 | Balourdet |
| 2012/0199501 A1* | 8/2012 | Le Gette .................. H05K 5/03 206/45.24 |
| 2018/0324974 A1 | 9/2018 | Mills |
| 2020/0192441 A1* | 6/2020 | Saravis .................. F16M 11/00 |

OTHER PUBLICATIONS

International Search Report and Written Opinion issued in corresponding Application No. PCT/US2020/012787 dated Aug. 4, 2020, 10 pages.
Mount, Ejection-Seat EKB Solution, Juggernaut Case, [online] retrieved from <URL:https://shop.juggernautcase.com/products/mount-ejection-seat-ekb-solution.html> retrieved on May 20, 2020.

* cited by examiner

*Primary Examiner* — Tu X Nguyen
(74) *Attorney, Agent, or Firm* — Polsinelli PC

(57) ABSTRACT

Various embodiments of systems and methods for an aerodynamic mount coupled to a module encasing a portable device in which the aerodynamic mount defines curved top and bottom edges that each form a curved edge portion in communication with a slope portion forming a gradually tapered slope for allowing high speed air flow to follow around the body of the mount when secured to the upper thigh of a pilot are disclosed herein.

20 Claims, 17 Drawing Sheets

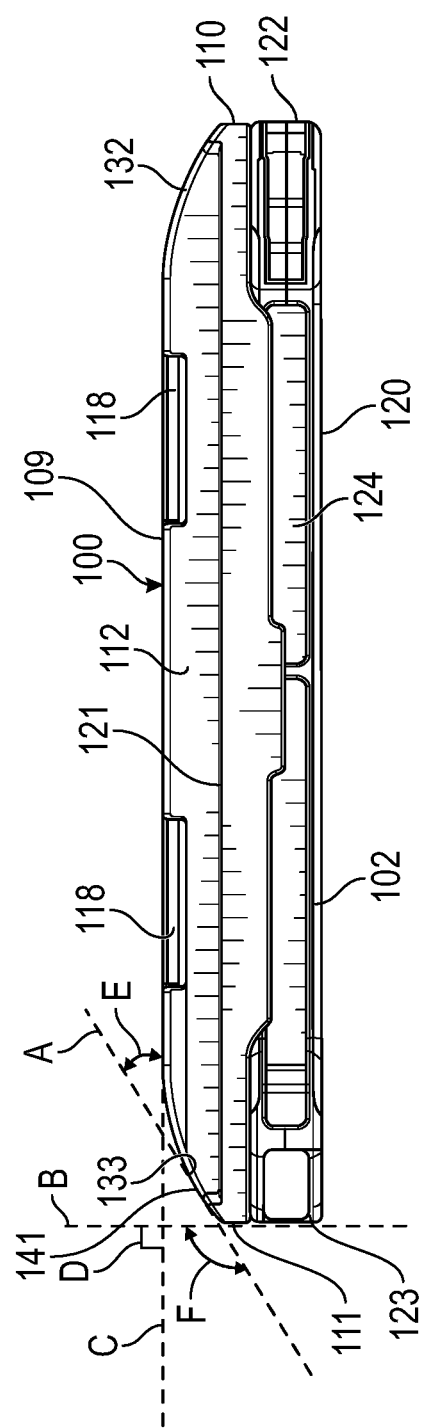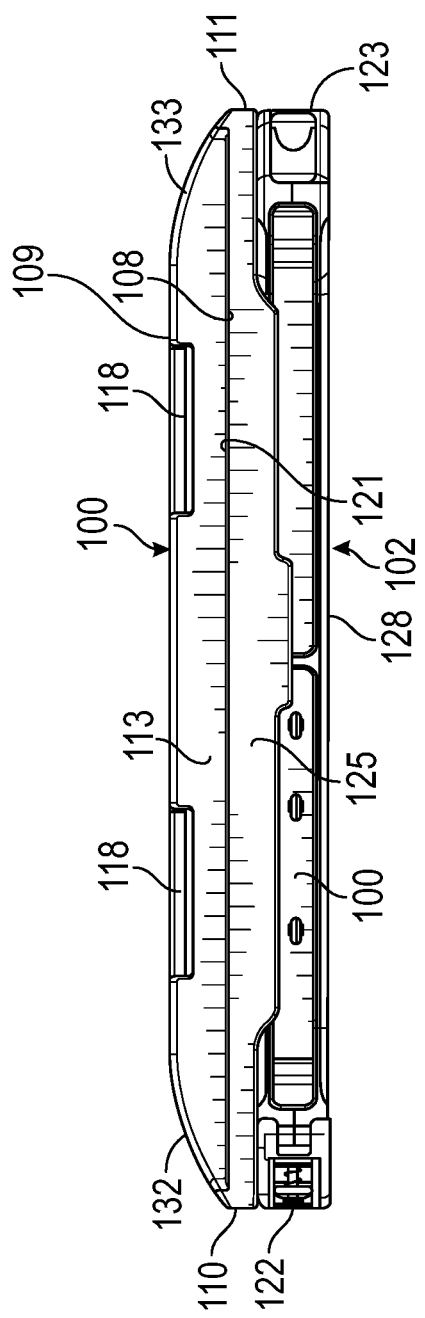

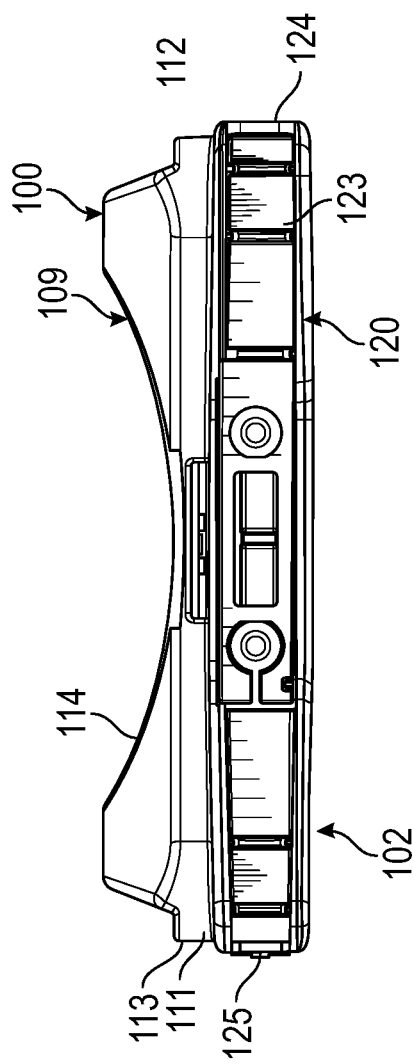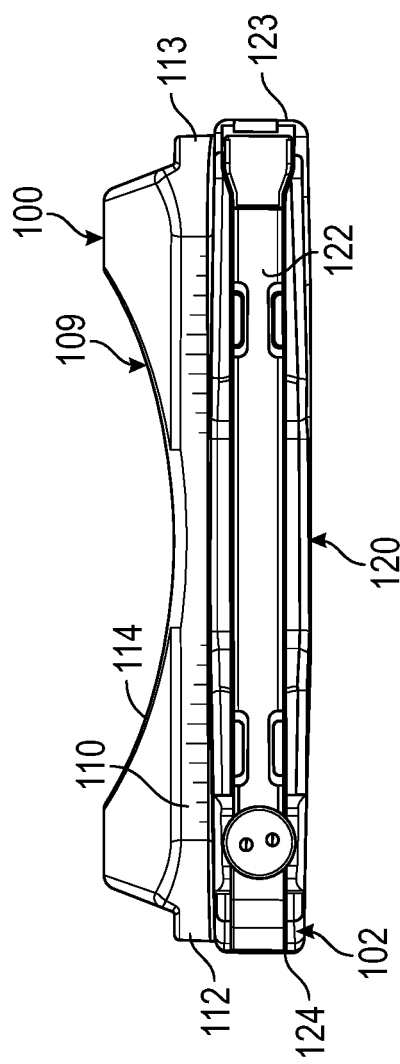

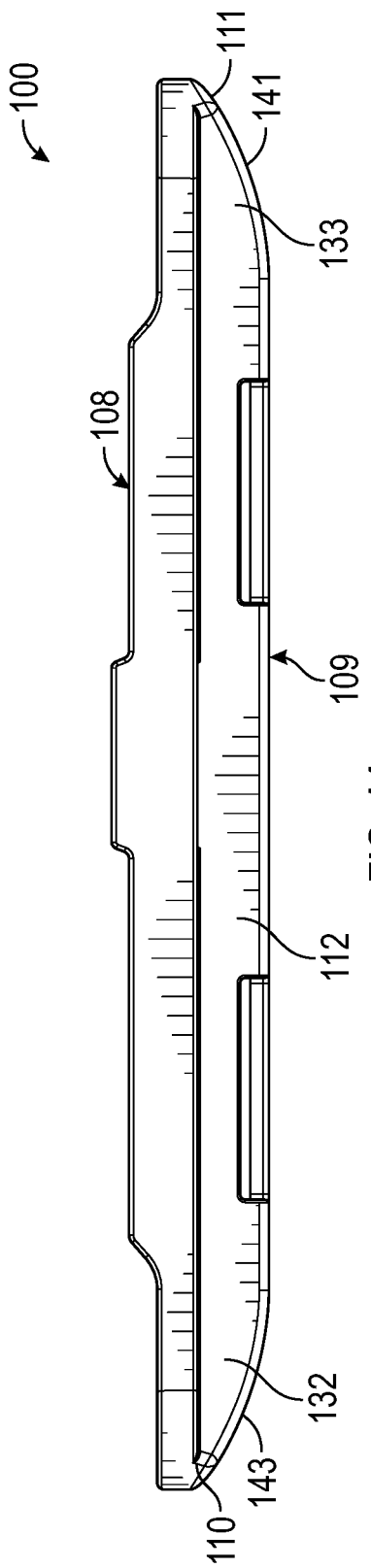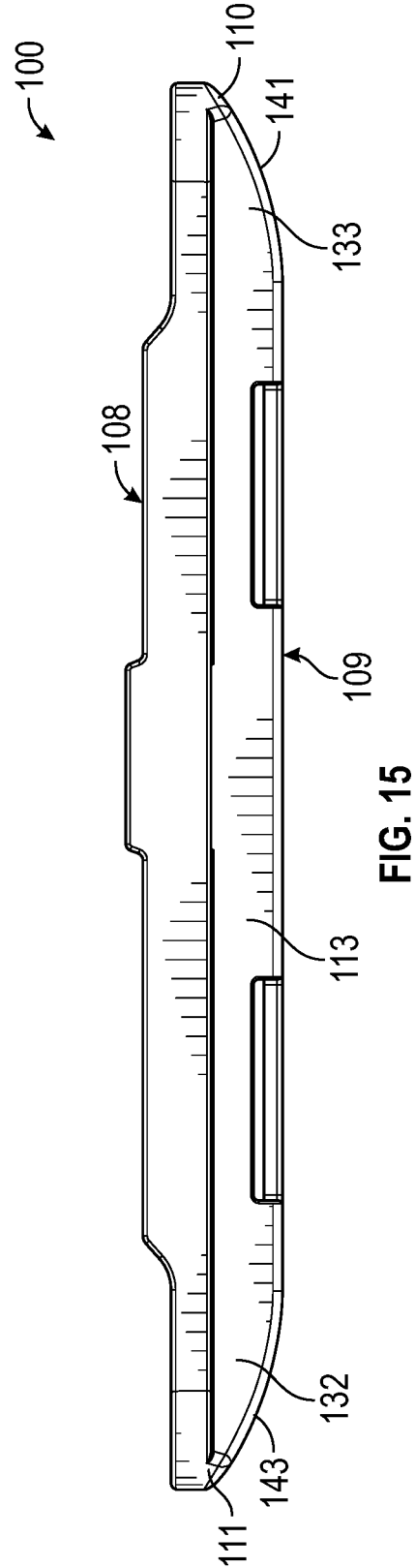

AERODYNAMIC MOUNT FOR A MODULE

CROSS REFERENCE TO RELATED APPLICATIONS

This is a non-provisional application that claims benefit to U.S. provisional application Ser. No. 62/789,801 filed on Jan. 8, 2019, which is herein incorporated by reference in its entirety.

FIELD

The present disclosure generally relates to aerodynamic holster mounts configured to be engaged to a respective module; and in particular, to an aerodynamic holster mount defining a tapered surface forming a slope portion configured to direct high speed air flow around the body of the mount during high speed ejections.

BACKGROUND

Fighter aircraft pilots can be equipped with accessory items, such as tablet or other types of mobile device, which may be encased in a module strapped around the thigh area of the pilot for accessible use during missions. When an ejection seat of a fighter aircraft is ejected from the aircraft during an emergency the pilot experiences high speed and turbulent air flow such that forces are applied to any external equipment secured to the body of the pilot, such as the module. In such situations as illustrated in FIG. 25, turbulent and high speed air flow A1 applied to the underside of a conventional module having a single strap strapped around the upper thigh of the pilot and a generally squared corner edges can generate sufficient lift against the conventional module, thereby causing a looseness or separation to occur between the module and upper thigh of the pilot. This separation or looseness can potentially also result in physical injury to the pilot due to the loose or separated module being capable of striking the body of the pilot with great force during a high speed ejection caused by the single strap arrangement and squared configuration of the conventional module.

It is with these observations in mind, among others, that various aspects of the present disclosure were conceived and developed.

BRIEF DESCRIPTION OF THE DRAWINGS

FIG. 5 is a side view of the mount engaged to the module.

FIG. 6 is an opposite side view of the holster mount engaged to the module.

FIG. 7 is a top view of the mount engaged to the module.

FIG. 8 is a bottom view of the mount engaged to the module.

FIG. 14 is a side view of the mount.

FIG. 15 is an opposite side view of the mount.

Corresponding reference characters indicate corresponding elements among the view of the drawings. The headings used in the figures do not limit the scope of the claims.

DETAILED DESCRIPTION

Figure 1:
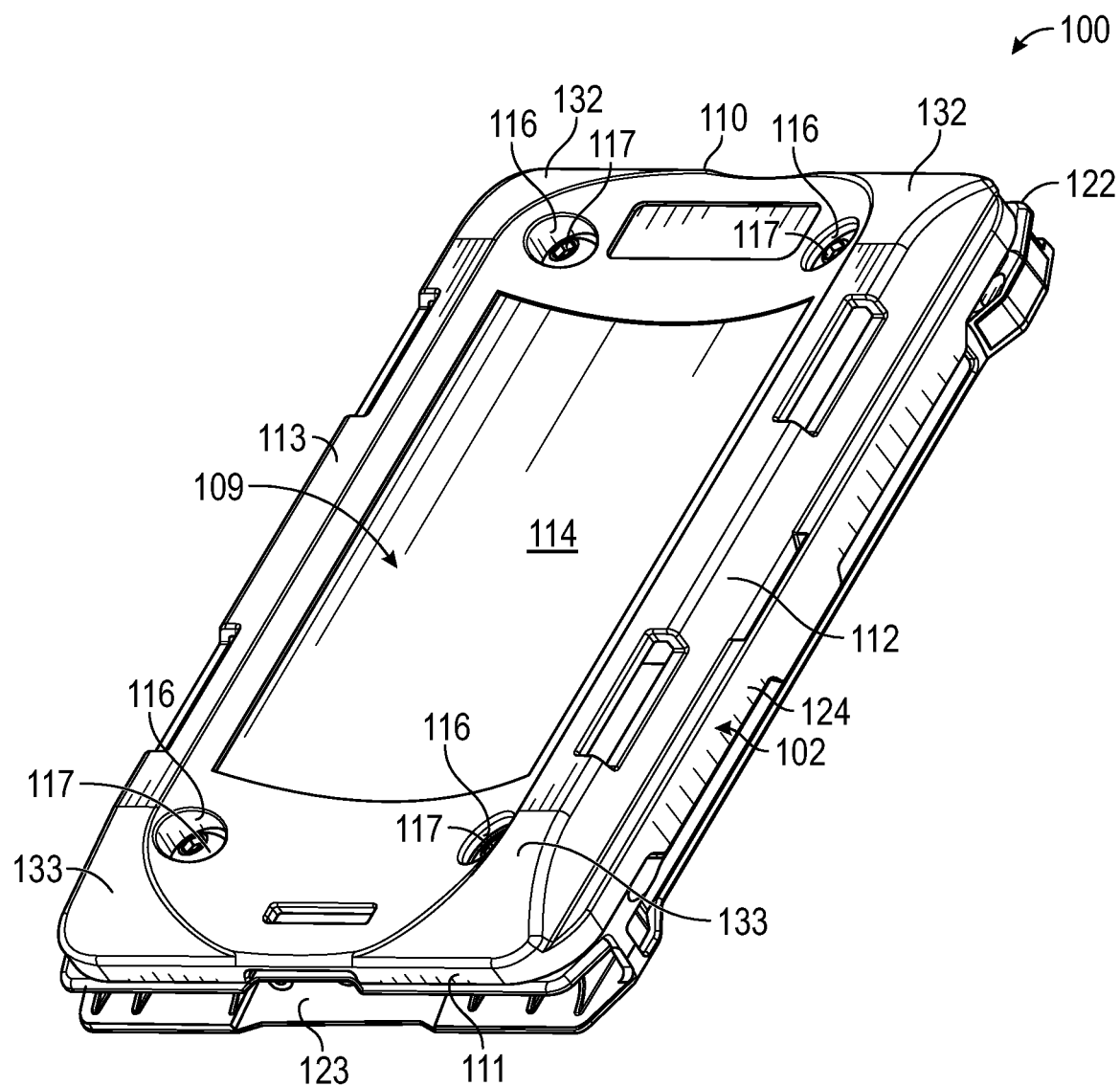
FIG. 1 is a perspective view of a mount engaged to a module.
Figure 2:
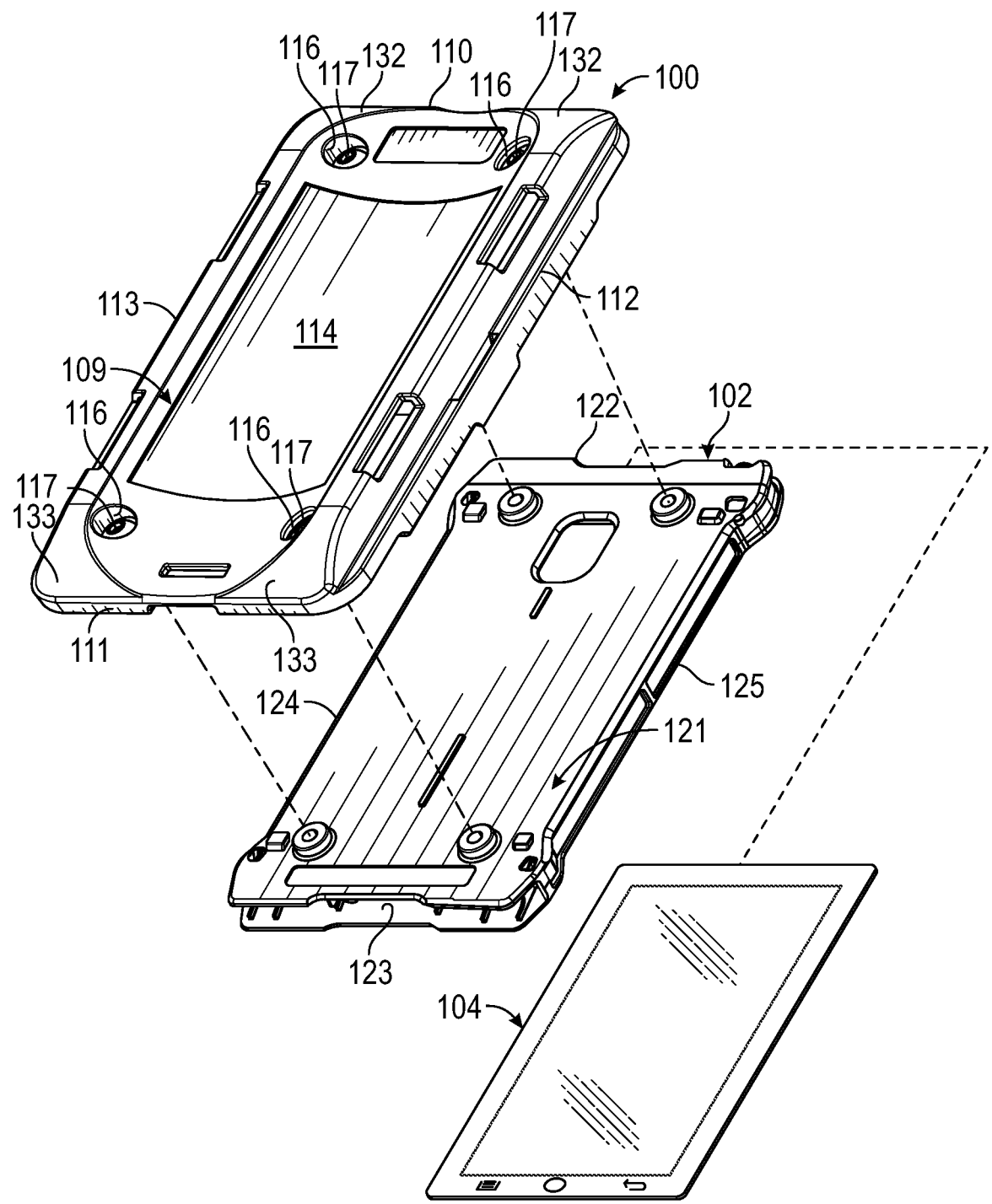
FIG. 2 is an exploded view of the mount and module configured to receive a device.

Various embodiments of an aerodynamically configured mount coupled to a module that encases a portable device are disclosed herein. In some embodiments, the holster mount has an aerodynamic configuration that evenly distributes the forces around the body of the mount under turbulent and high speed wind conditions that occur during high speed ejections, for example, when an ejection seat is deployed from an aircraft with the mount usually strapped around the upper thigh area of a pilot. In one embodiment, each curved edge of the mount forms a slope portion that distributes applied forces around the body of the mount during high speed ejections. In one aspect, the mount includes a pair of straps that are configurable to be strapped around the upper thigh area of a user and assists in spreading the force applied to the mount during a high speed ejection and reduce the potential leverage applied by the mount to the femur of the user. In some embodiments, the mount defines a saddle portion configured to comport with the general shape of a user's upper thigh when the mount is strapped to the user. In some embodiments, the module includes a pivotable access door in communication with a slotted opening configured to allow for the removal or insertion of the tablet or portable device from the module. In one aspect, the module is configured to encase a portable device as well as establish a secure engagement with the mount that prevents separation from the module during high speed ejections. In another aspect, the holster is configurable to securely engage different types of modules used to encase different kinds of portable devices. Referring to the drawings, an embodiment of a mount having an aerodynamic configuration is illustrated and generally indicated as 100 in FIGS. 1-22.

As shown in FIGS. 1-8, the mount 100 is configured to be securely engaged to a module 102 that encases a portable device 104 therein. In some embodiments, the portable device 104 may be a tablet, such as a Samsung GALAXY Tab Active 2 or other type of communications/computing apparatus. In some embodiments, the mount 100 may be configured to be secured to the module 102 using a snap fit connection that couples the two components together in combination with securing members 117, such as screws, which further secure the two components together as shall be described in greater detail below.

Figure 9:
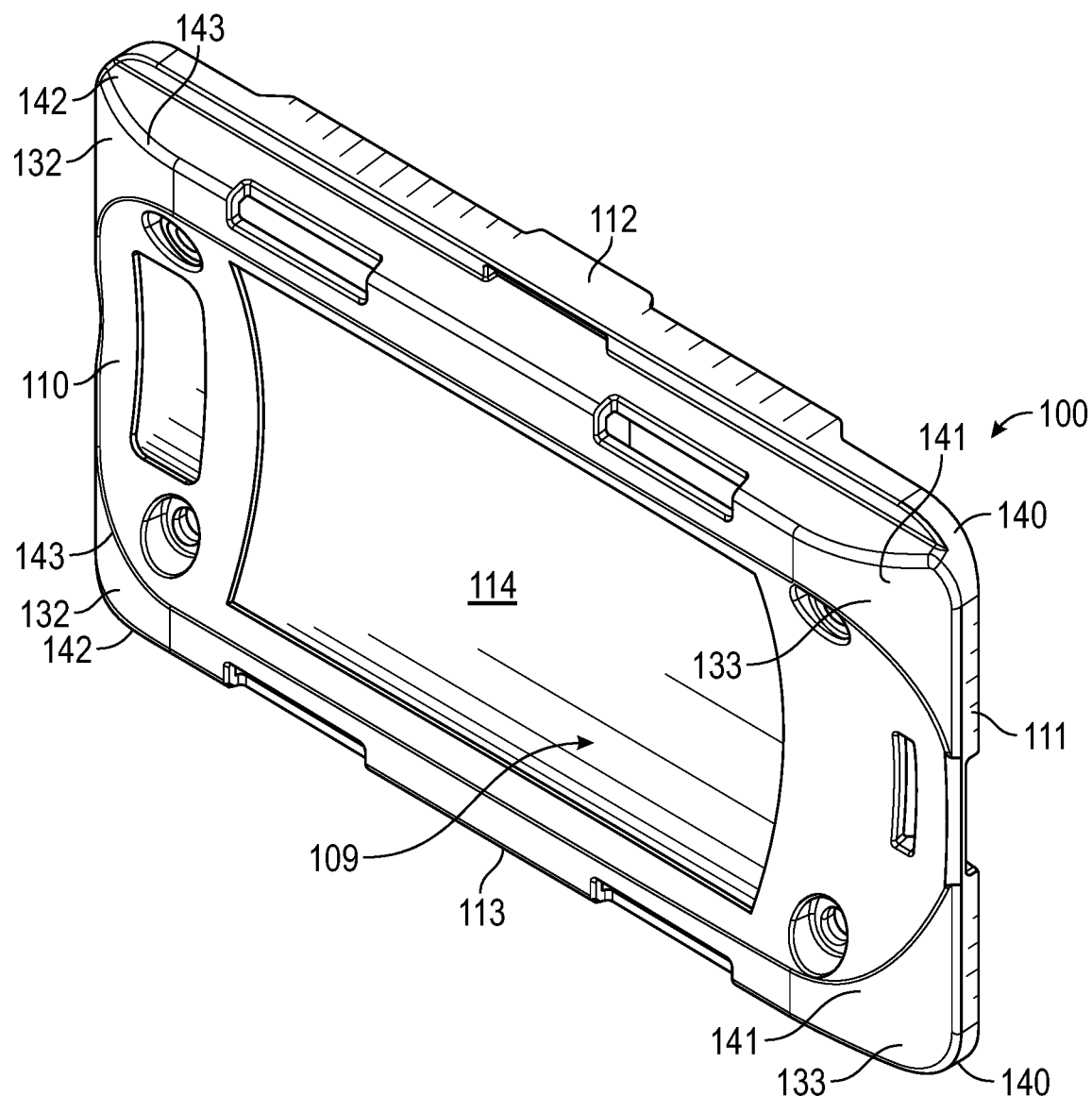
FIG. 9 is a perspective view of the mount.
Figure 10:
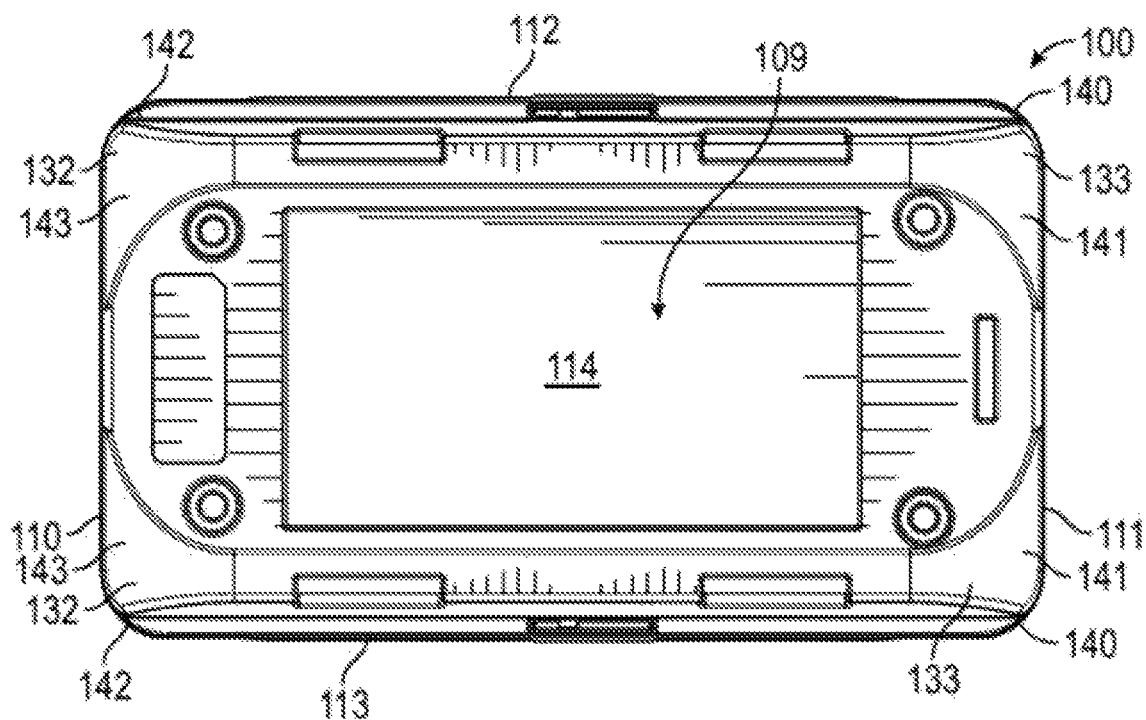
FIG. 10 is a front view of the mount.

Referring to FIGS. 9-15, an embodiment of the mount 100 configured to securely engage a module 102 is described. The mount 100 defines a front side 108, a rear side 109, a top side 110, a bottom side 111, and opposite first and second sides 113 and 114 that collectively form a generally rectangular shaped mount body 106. As shown in FIGS. 9 and 10, the rear side 109 of the mount 100 defines a curved-shaped saddle portion 114 that extends axially the length of the mount 100 and is configured to comport with the generally-curved shape of the upper thigh area of a user, such as a pilot, when the mount 100 is strapped around the upper thigh.

As noted above, the mount body 106 of the mount 100 is configured to direct high speed air flow around the mount body 106 to prevent generating a lifting action against the mount 100 that is engaged to the module 102 during a high speed ejection. In some embodiments a respective pair of edges 132 and 133 is formed along the corners of the mount 100 to direct high speed air flow around the mount body 106 during a high speed ejection when turbulent and high speed air flow impacts the mount 100. As shown in FIG. 9, the pair of edges 132 each defines a curved edge portion 142 in communication with a slope portion 143 that is configured to direct air flow around the mount body 106 of the mount 100. Similarly, the pair of edges 133 each defines a curved edge portion 140 in communication with a slope portion 141 that is configured to direct high speed air flow around the mount body 106 of the mount 100. Collectively, the two pairs of edges 132 and 133 are configured to direct high speed air flow around the mount body 106 and prevent any lift or separation of the mount 100 during a high speed ejection.

In particular, the configuration of slope portion 141 defined along each curved edge 133 is identical to the configuration of the slope portion 143 defined along each curved edge 132 such that the tapered surface of each curved edge 132 and 133 causes air flow to be directed around and the mount 100 and module 102 combination that prevents any kind of lifting action from occurring during a high speed ejection from an aircraft.

Referring to FIG. 5, by way of example, each of the slope portions 141 and 143 defines an identically configured sloping surface that tapers away from the top side 122 of the mount 100. In some embodiments, each of the slope portions 141 and 143 of the mount 100 tapers away from top surface 122 of the module 102 at an obtuse angle F defined between the longitudinal axis B and the slope axis A of the mount 100. In this configuration, an acute angle E is formed between the slope axis A and the latitudinal axis C of the mount 100. In this particular arrangement, the longitudinal axis B of the mount 100 is oriented in perpendicular relation to latitudinal axis C.

As illustrated in FIG. 9, the curved edge portion 140 communicates with the slope portion 141 for each respective curved edge 132, while the curved edge portion 142 similarly communicates with the slope portion 143 for each respective curved edge 133. The general configuration and combination of the slope portions 141, 143 and curved edge portions 140, 142 direct air flow around the mount body 106 of the mount 100 without generating any lifting action against the mount 100 and module 102 combination when strapped to the user.

Figure 3:
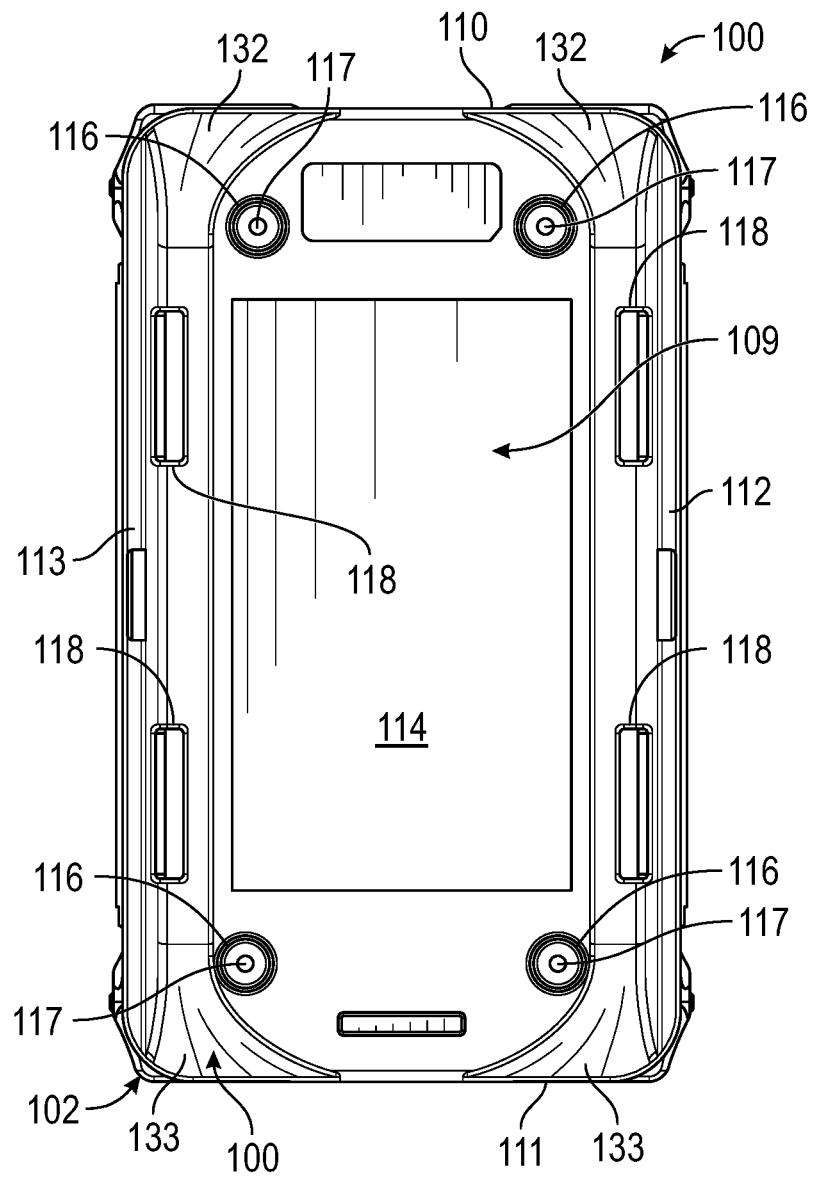
FIG. 3 is a front view of the mount engaged to the module.
Figure 4:
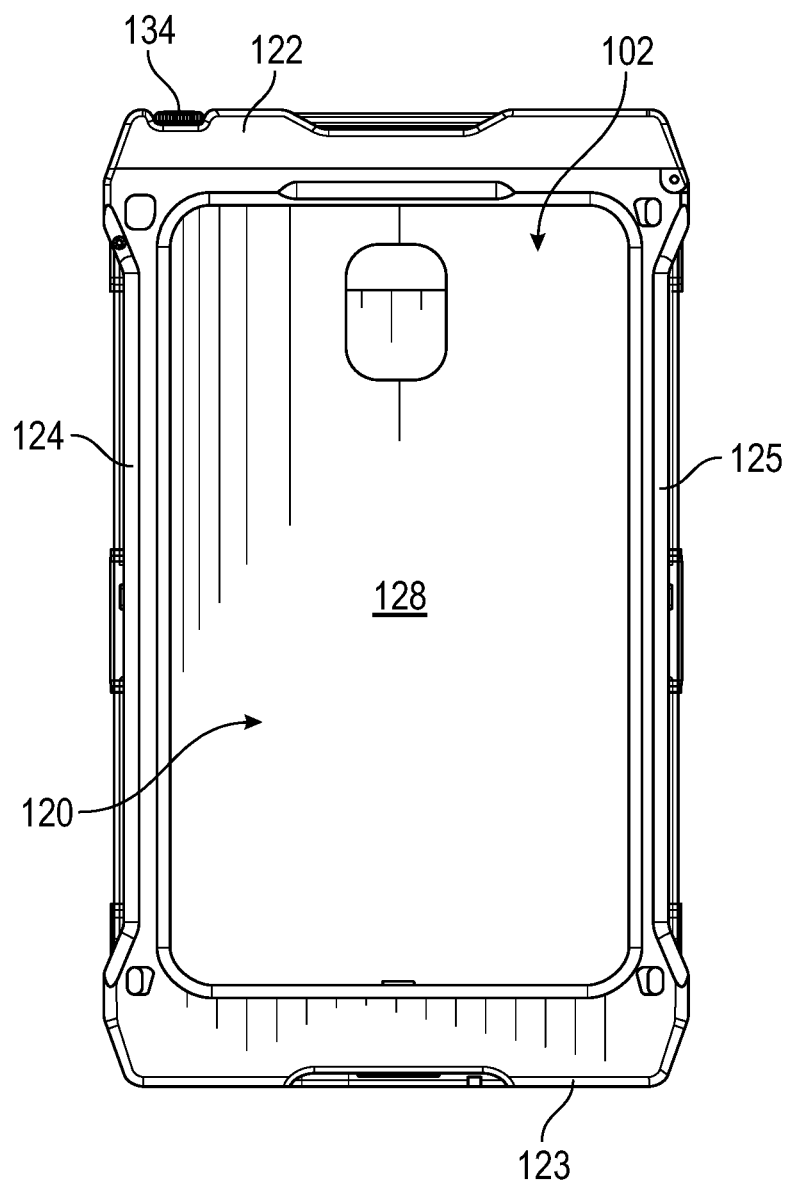
FIG. 4 is a rear view of the module engaged to the mount.
Figure 23:
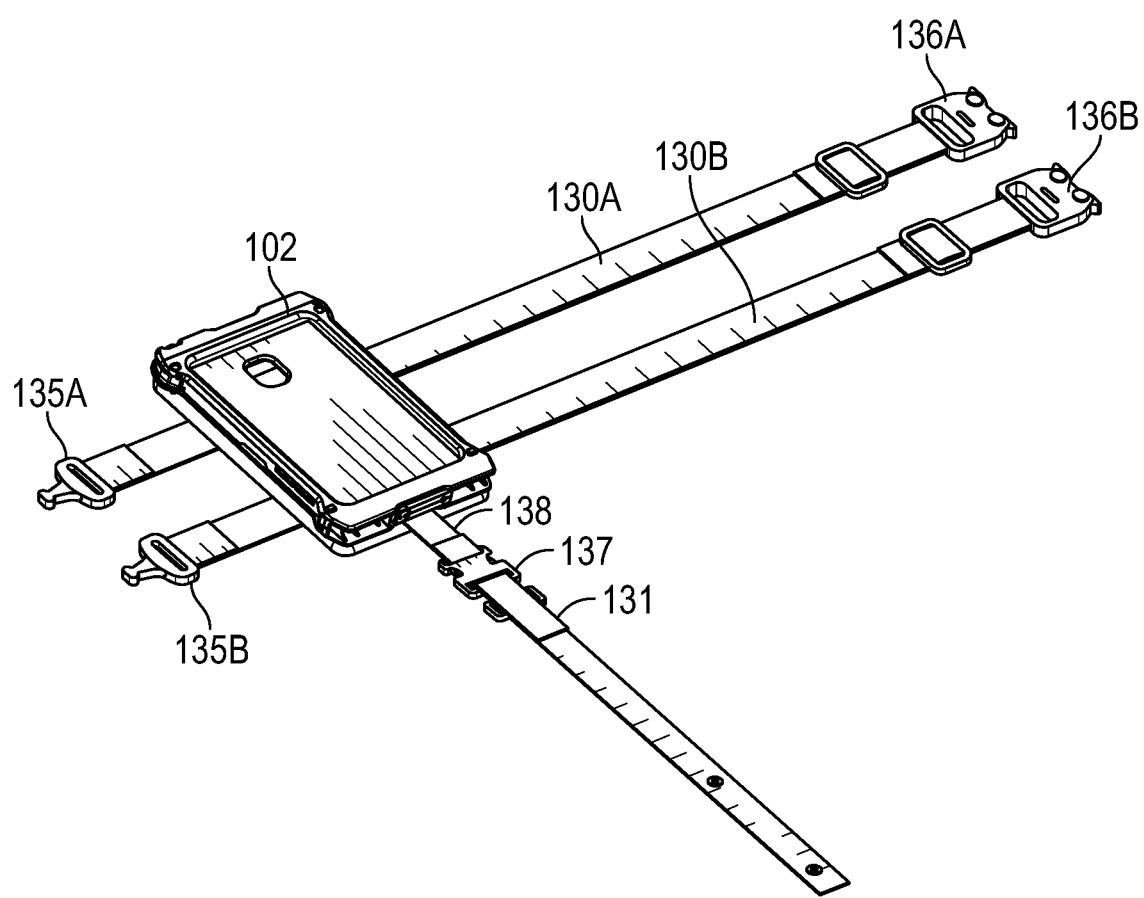
FIG. 23 is a front perspective view of the module engaged to the mount showing securing straps coupled to the mount.
Figure 24:
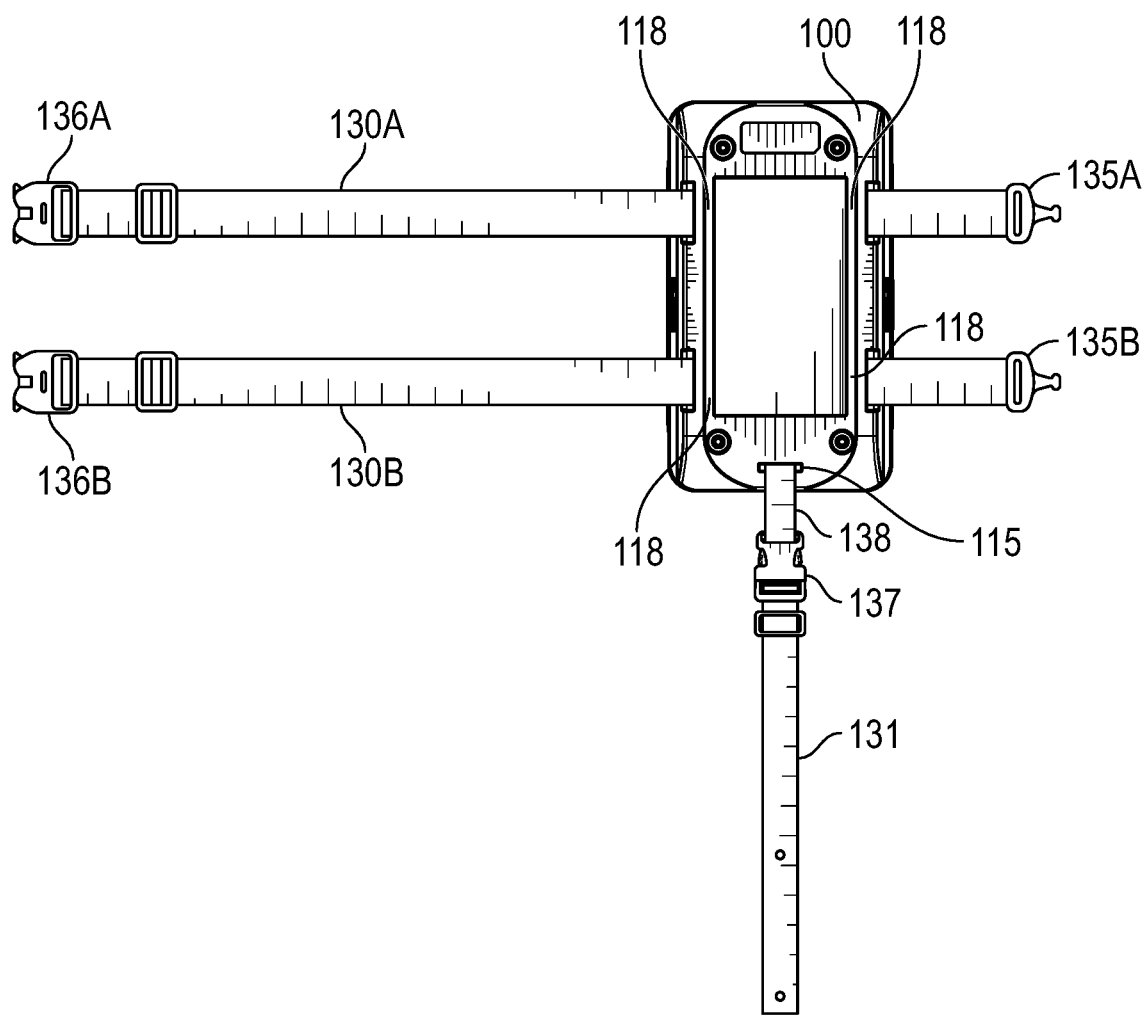
FIG. 24 is a rear plan view of the mount engaged to the module showing securing straps coupled to the mount.

Referring to FIGS. 3, 23 and 24, the mount body 106 of the mount 100 further defines a plurality of strap mountings 118 each defining a respective slot configured to engage a respective securing strap 130A, securing strap 130B, connector 135A, and connector 135B. In particular, as shown in FIG. 24, in some embodiments the securing strap 130A may have one end engaged to the strap mounting 118 with the opposite end of securing strap 130A having a coupling member 136A. The connector 135A is operable to be coupled to the coupling member 136A of the securing strap 130A when strapping the mount 100 around the upper thigh area of a user. Similarly, the securing strap 130B may have one end engaged to a strap mounting 118 with the opposite end of the securing strap 130B having a coupling member 136B. The connector 135B is operable to be coupled to the coupling member 136B of the securing strap 135B when strapping the mount 100 around the upper thigh area of the user.

Figure 26:
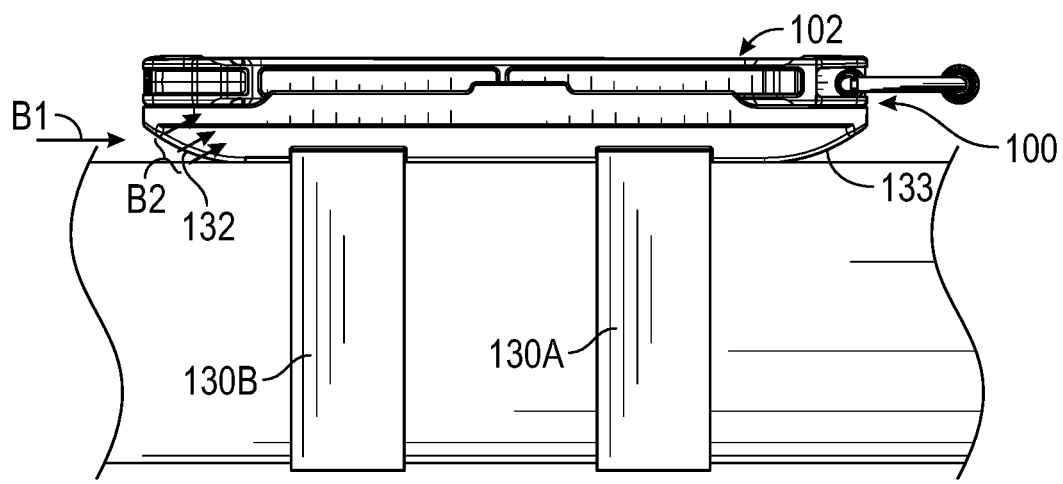
FIG. 26 is an illustration of the mount coupled to the module of FIGS. 1-8 showing the curved edges of the mount directing high speed air flow around the body of the mount during a high speed ejection that does not generate a lifting force against the mount.

Referring to FIG. 26, as noted above in some embodiments the securing straps 130A and 130B are wrapped around the upper thigh area of the user and then secured to respective coupling member 136A/136B, which are coupled to a respective connector 135A/135B. As further shown, an attachment strap 138 includes one end coupled to an attachment strap mount 115 (FIG. 24) formed through the mount body 106 of the mount 100 and an opposite end secured to a coupling arrangement 137 for engaging the attachment strap 138 to a securing strap 131. In some embodiments, the securing strap 131 extends from the mount 100 in perpendicular relation to the securing straps 130A and 130B and is configured to be coupled to the user's vest, belt, and/or garment for further securement of the mount 100 to the user.

Figure 11:
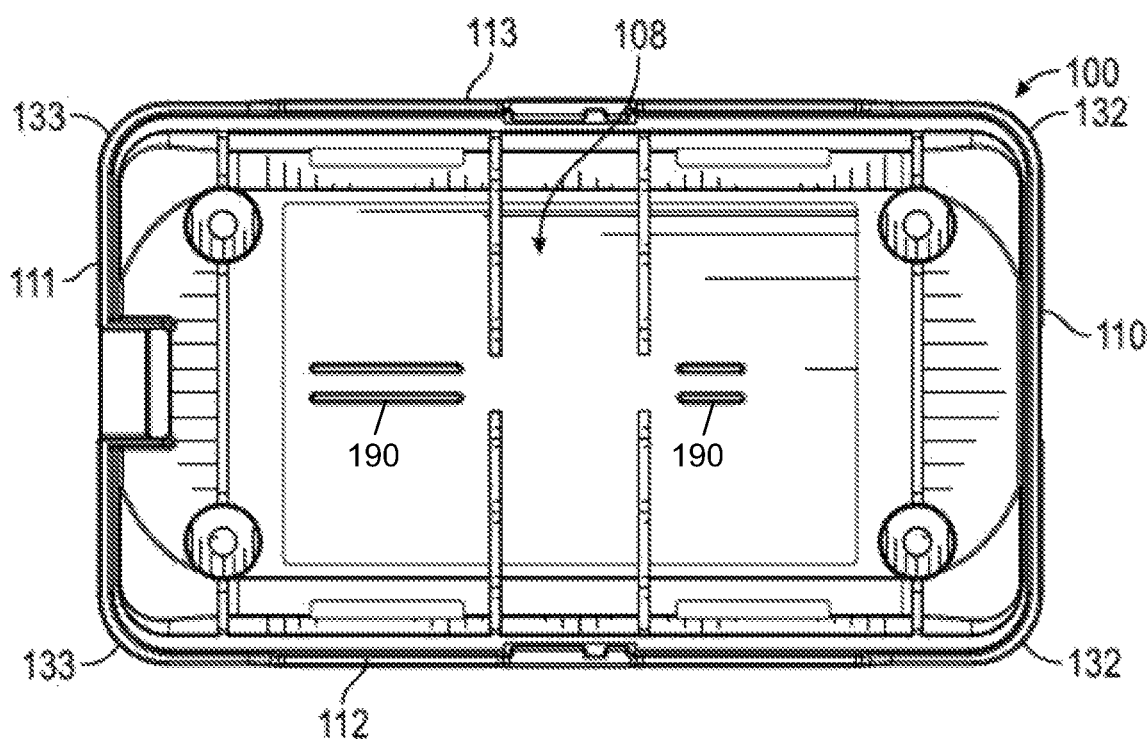
FIG. 11 is a rear view of the mount.
Figure 12:
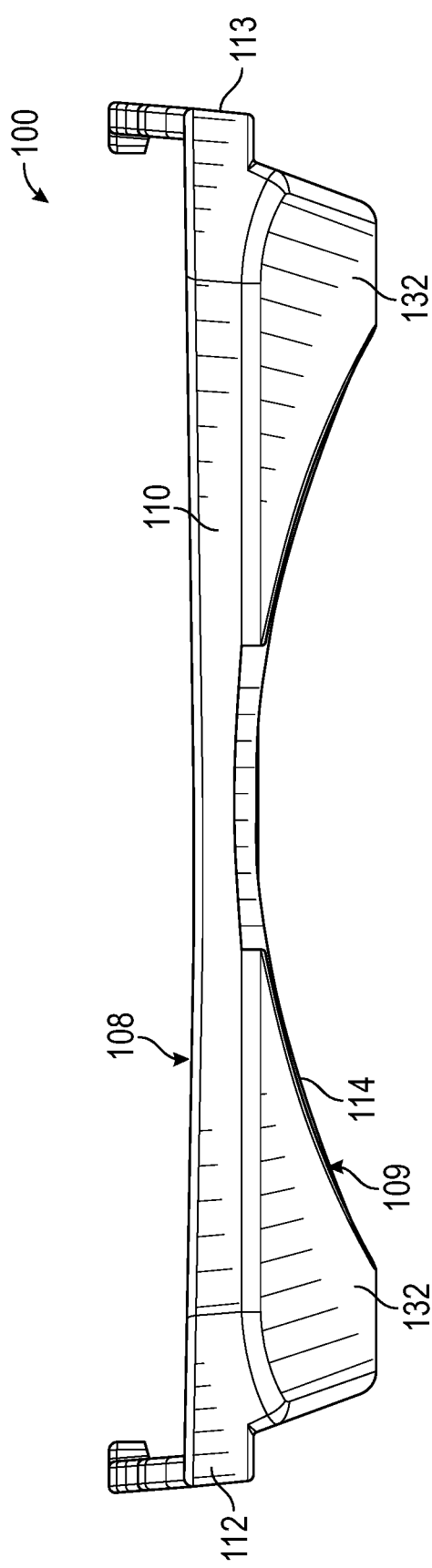
FIG. 12 is a top view of the mount.
Figure 13:
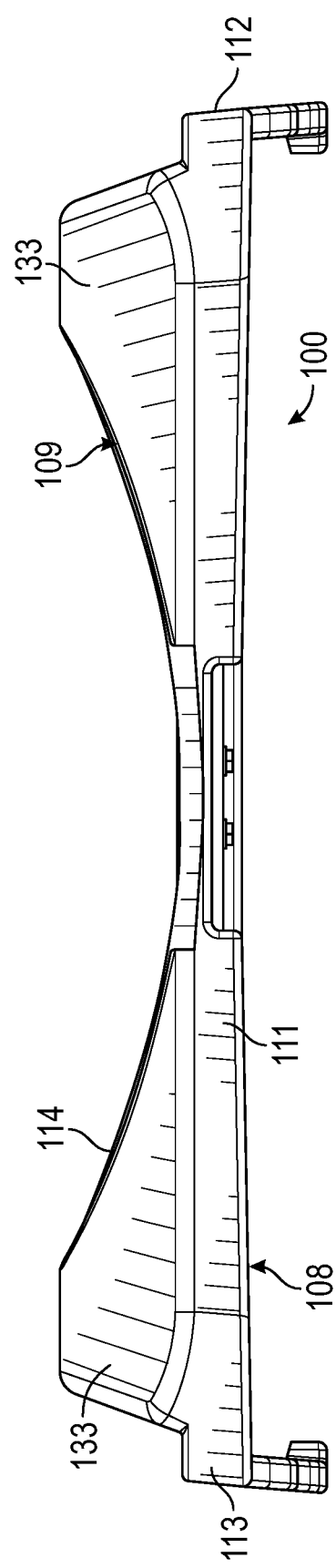
FIG. 13 is a bottom view of the mount.
Figure 16:
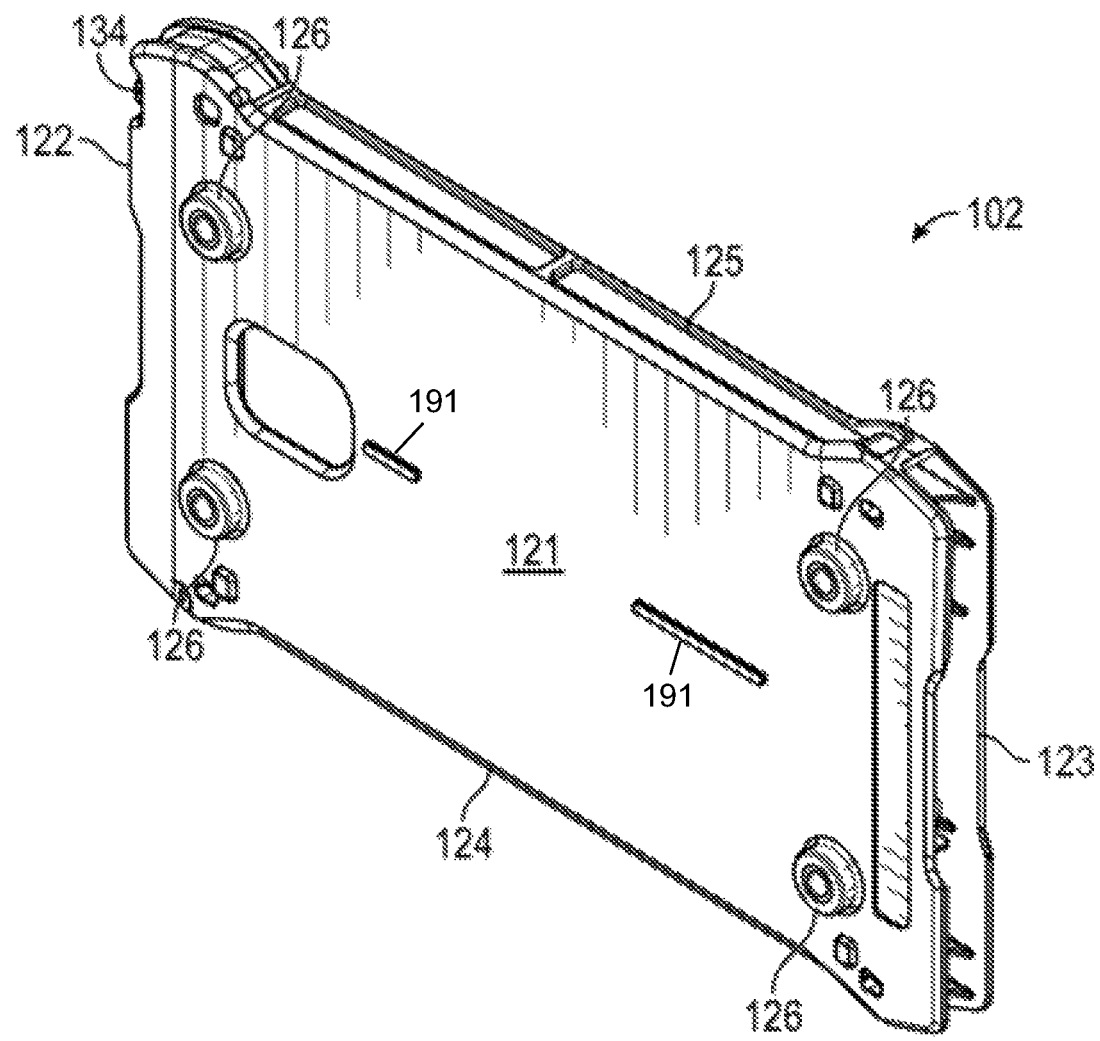
FIG. 16 is a perspective view of the module shown in FIGS. 1-8.

Referring to FIGS. 11 and 16, the mount 100 defines a plurality of raised ribs 190, while the module 102 also defines a plurality of raised ribs 191 in which the plurality of raised ribs 190 of the mount 100 and the plurality of raised ribs 191 of the module 102 are collectively configured to engage and pinch the respective securing strap 130A, 130B. When the mount 100 and module 102 combination is strapped to the user through straps 130A, 130B the pinching action of the plurality of raised ribs 190, 191 against the straps 130A, 130B helps maintain the mount 100 in position on the leg of the user and prevents the mount 100 from slipping along the straps 130A, 130B during a high speed ejection.

Figure 17:
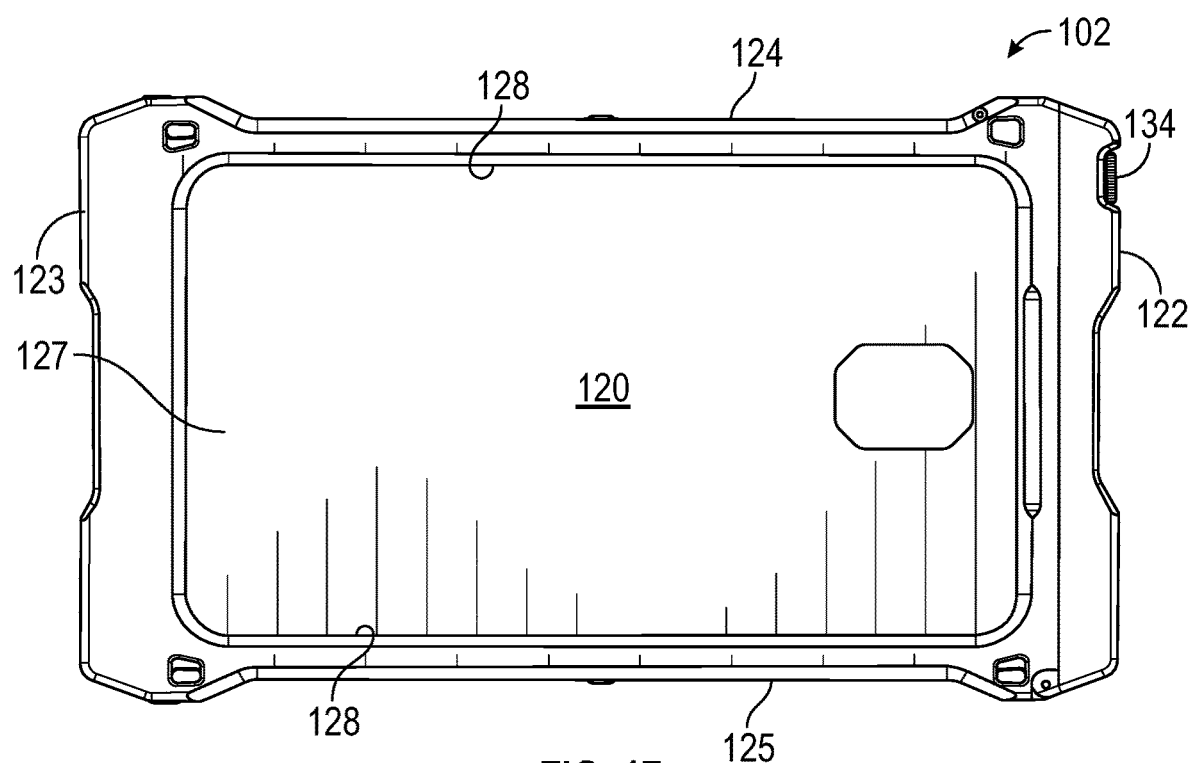
FIG. 17 is a front view of the module.

Referring to FIGS. 16-22, an embodiment of the module 102 is configured to encase a portable device 104 as well as securely engage the mount 100. In some embodiments, the module 102 defines a front side 120, a rear side 121, a top side 122, a bottom side 123, and opposite first and second sides 124 and 125 that collectively form a module body 119 of the module 102. As shown in FIG. 17, the front side 120 of the module 102 defines a rectangular-shaped opening 128 in communication with an internal chamber 127 configured to permit access to the portable device 104 when disposed within the internal chamber 127 of the module 102.

Figure 18:
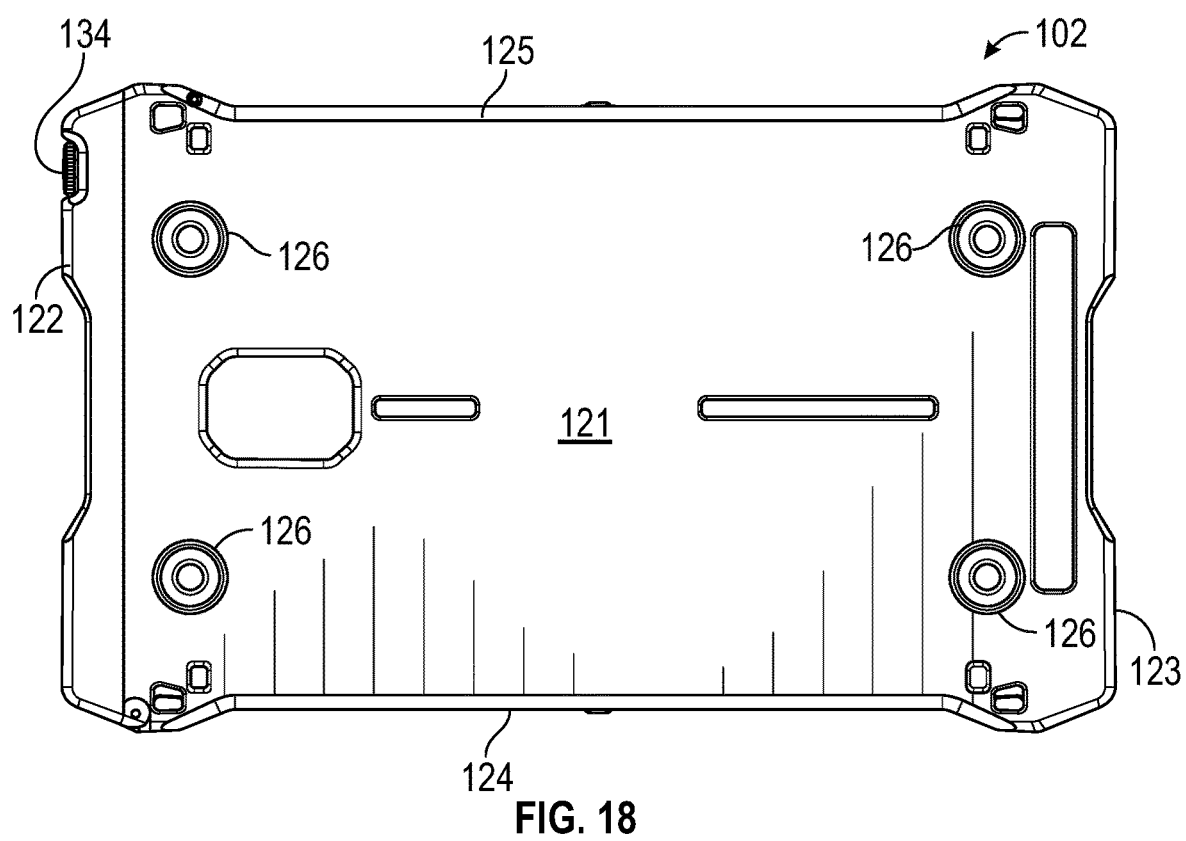
FIG. 18 is a rear view of the module.

Referring to FIG. 18, the rear side 121 of the module 102 defines a plurality of threaded engagement points 126 configured to receive one or more securing members 117 once the mount 100 has been initially coupled to the module 102 in a snap fit engagement. In this arrangement, the engagement points 126 of the module 102 are aligned with the respective apertures 116 of the mount 100 in order to receive a respective securing member 117. As such, the combination of the snap fit engagement between the mount 100 and the module 102 in addition to engagement of the securing members 117 between the two components provides a secure engagement that prevents decoupling of the mount 100 from the module 102 during high speed ejections.

Figure 19:
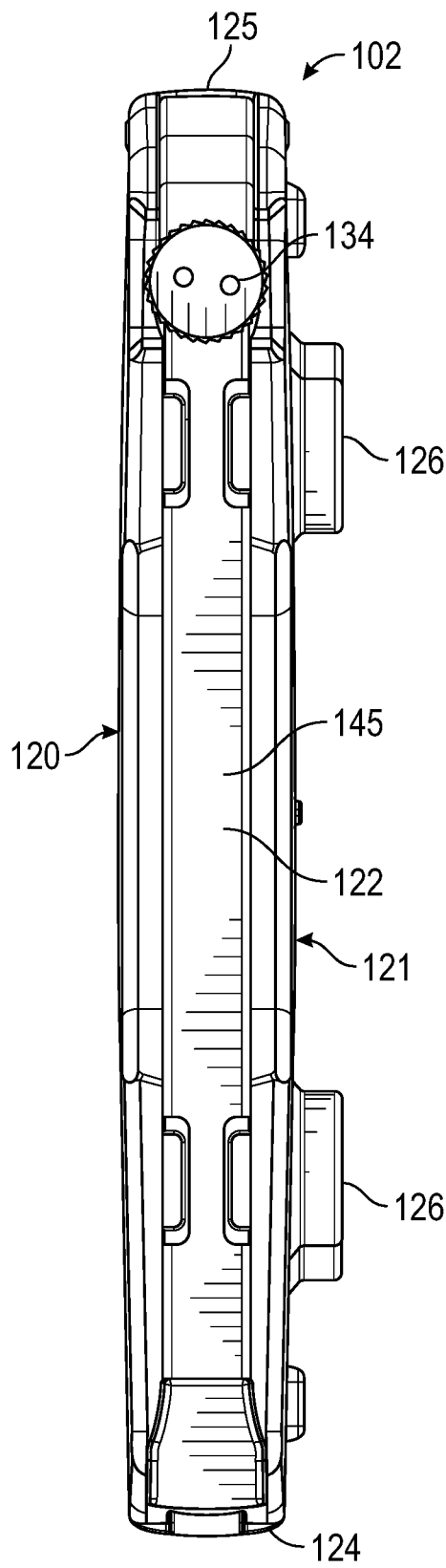
FIG. 19 is a top view of the module.
Figure 20:
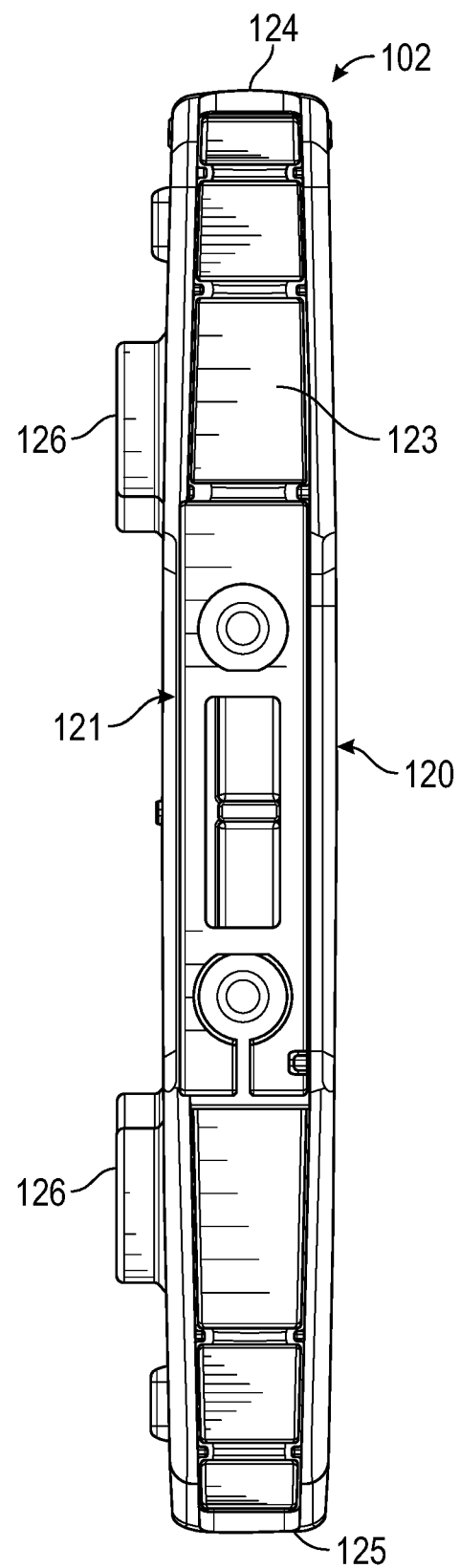
FIG. 20 is a bottom view of the module.
Figure 21:
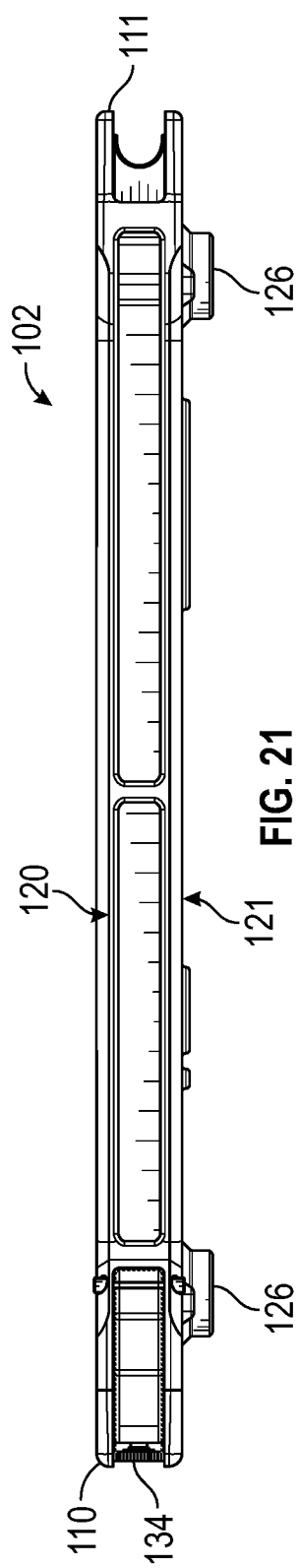
FIG. 21 is a side view of the module.
Figure 22:
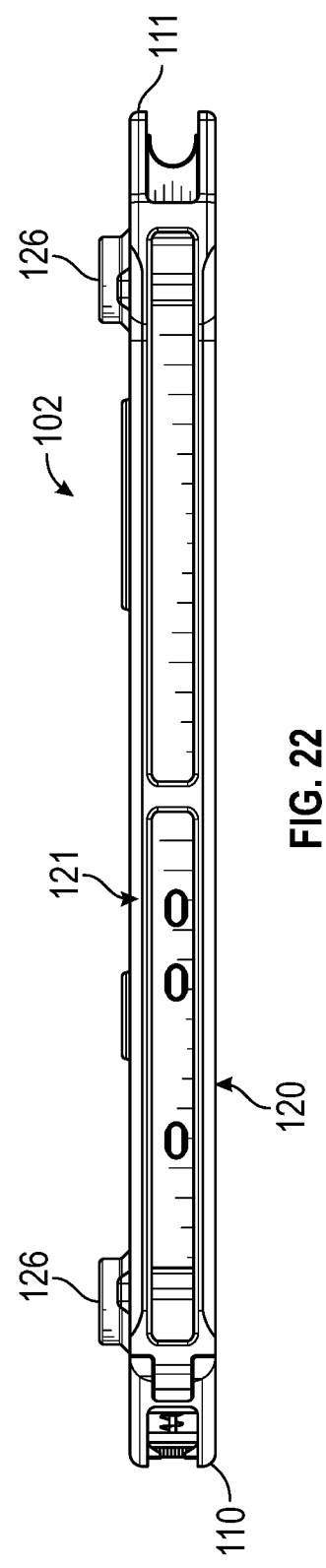
FIG. 22 is an opposite side view of the module

Referring to FIG. 19, in some embodiments an access door 145 is disposed along the top side 122 of the module 102 having one end that establishes a pivot point along the top side 122 to pivot the access door 145 between an open position in which a slotted opening (not shown) formed along the top side 122 is exposed and a closed position in which the access door 145 closes off access to the slotted opening once the portable device 104 is disposed within the chamber 127. In some embodiments, the access door 145 includes a spring loaded locking knob 134 that is rotated in one rotational direction to unlock the access door 145 and allow the access door 145 to pivot to the open position and permit access to the chamber 127. Conversely, rotation of the locking knob 134 in an opposite rotational direction locks the access door 145 in place once the access door 145 has assumed the closed position.

Figure 25:
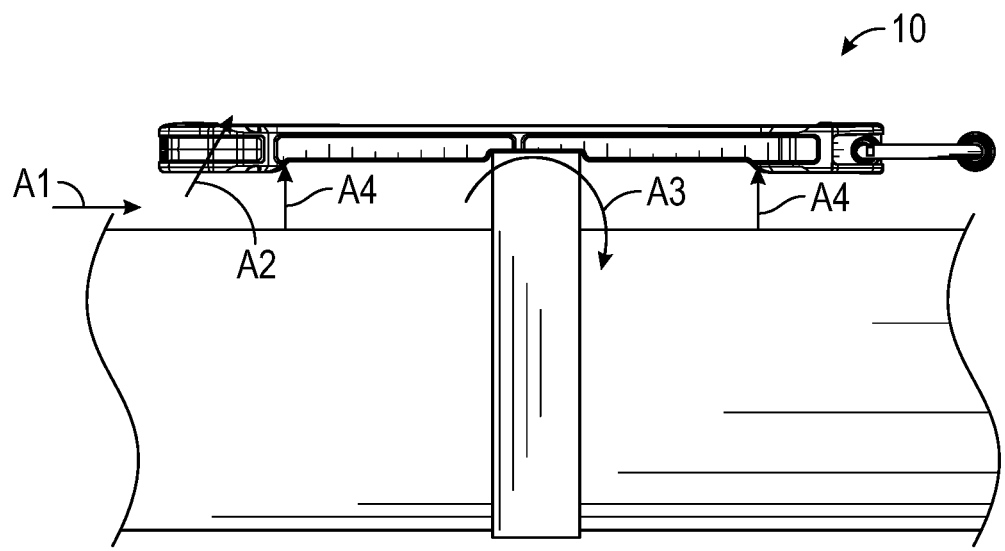
FIG. 25 is an illustration of a prior art module coupled to the user's leg showing the direction of high speed air flow directly against the module that generates a lifting force that causes separation or looseness of the module when strapped around the upper thigh of a user during a high speed ejection.

Referring to FIGS. 25 and 26, a comparison of the direction of high speed air flow relative to a module 10 without a mount 100 and the direction of high speed air flow around the module 102 when coupled to the mount 100 during a high speed ejection is illustrated. As shown in FIG. 25, a prior art module 10 without mount 100 provides a symmetrical profile, such as squared and non-sloping edges. As shown, such a squared and non-sloping profile of the prior art module 10 allows high speed air flow A1 to impact the squared edges as air flow A2 such that turbulent air flows A3 and A4 generate a lifting effect that can cause an undesirable separation between the module 10 and the upper thigh of the user. In comparison to the prior art module 10, the module 102 coupled to the aerodynamic mount 100 with curved edges 132 and 133 allows high speed air flow B1 to flow around the curved edge portions 140 and 142 and the slope portions 141 and 143, respectively, of the mount 100 as air flow B2 such that no lifting action is generated that would cause separation of the mount 100 from the upper thigh area of the user.

It should be understood from the foregoing that, while particular embodiments of the mount have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A mount comprising:
a mount body collectively defined by a front side, a rear side, a top side, a bottom side, and first and second opposite sides;
a plurality of engagement apertures defined through the mount body; and
a plurality of securing members, wherein one of the plurality of securing members is disposed within each of the plurality of engagement apertures of the mount body;
wherein the mount body defines curved edges formed along a peripheral edge of the mount body, each of the curved edges defining a tapered surface forming a slope portion; and
wherein each of the plurality of engagement apertures and each of the securing members are configured for alignment with a module.

2. The mount of claim 1, wherein the curved edges each define a curved edge portion formed along the peripheral edge of the mount body and in communication with the slope portion.

3. The mount of claim 2, wherein the mount body further defines a saddle portion extending axially along the mount body, the saddle portion defining a curved cross-sectional profile.

4. The mount of claim 1, wherein the mount body further defines a plurality of strap mounts forming a respective slot configured to engage a strap.

5. The mount of claim 4, wherein the mount body further defines an attachment strap mount oriented in perpendicular relation to the plurality of strap mounts and configured to engage an attachment strap.

6. The mount of claim 1, wherein each slope portion tapers upward and away from the peripheral edge of the mount body.

7. A system comprising:
a mount comprising:
a mount body collectively defined by a front side, a rear side, a top side, a bottom side, and first and second opposite sides; wherein the mount body defines curved edges formed along a peripheral edge of the mount body, each of the curved edges defining a tapered surface forming a slope portion; and
a module engaged to the mount, the module comprising:
a module body collectively defined by a front side, a rear side, a top side, a bottom side, and first and second opposite sides; and
an internal chamber formed within the module body, the internal chamber configured to receive a portable device therein.

8. The system of claim 7, wherein the module further includes an access door in communication with a slotted opening formed through the module body, the access door being operable between a closed position and an open position.

9. The system of claim 8, wherein the access door includes a knob operable for placing the access door between open and closed positions.

10. The system of claim 7, wherein the mount body defines a plurality of apertures configured to receive a respective securing member, and wherein the module defines a plurality of engagement points in respective alignment with the plurality of apertures of the mount for engaging the module to the mount.

11. The system of claim 7, wherein the curved edges each define a curved edge portion formed along the peripheral edge of the mount body and in communication with the slope portion.

12. The system of claim 7, wherein the mount body further defines a saddle portion extending axially along the mount body, the saddle portion having a curved cross-sectional profile.

13. The system of claim 7, wherein the mount body further defines a plurality of strap mounts forming a respective slot configured to engage a strap.

14. The system of claim 13, wherein the mount defines a first plurality of raised ribs and the module defines a second plurality of raised ribs, wherein the first and second plurality of raised ribs are configured to engage and pinch the respective strap when the mount is engaged to the module.

15. The system of claim 7, wherein each slope portion tapers upward and away from the peripheral edge of the mount body.

16. A system, comprising:
a mount comprising:
a mount body collectively defined by a front side, a rear side, a top side, a bottom side, and first and second opposite sides; wherein the module body defines curved edges formed along a peripheral edge of the mount body, each of the curved edges defining a tapered surface forming a slope portion;
a plurality of strap mountings defined by the mount body and configured to engage a respective securing strap; and
a plurality of engagement apertures defined through the mount body; and
a plurality of securing members, wherein one of the plurality of securing members is disposed within each of the plurality of engagement apertures of the mount body;
a module for engagement with the mount, the module comprising:
a module body defining a front side, rear side, a top side, a bottom side, and first and second opposite sides; and
a plurality of threaded engagement points defined on the rear side of the module body in respective alignment with the plurality of engagement apertures of the mount; and
wherein each of the plurality of threaded engagement points of the module is configured to receive one of the plurality of securing members while in alignment with each of the plurality of engagement apertures.

17. The system of claim 16, wherein each of the respective straps is configured to be wrapped around the upper thigh of a user such that the mount is secured to the upper thigh of a user.

18. The system of claim 16, wherein the rear side of the mount body further defines a saddle portion extending axially along the rear side, the saddle portion defining a curved cross-sectional profile for engagement with the upper thigh of a user.

19. The system of claim 16, wherein the module further defines an internal chamber configured to receive a portable device.

20. The system of claim 16, wherein the mount body is configured to be in snap fit engagement with the module.

* * * * *